(12) United States Patent
Sergey et al.

(10) Patent No.: US 7,113,671 B2
(45) Date of Patent: Sep. 26, 2006

(54) OPTICAL COUPLING DEVICE, FABRICATING METHOD THEREOF, OPTICAL COUPLING DEVICE ASSEMBLY, AND LENSED FIBER USING THE OPTICAL COUPLING DEVICE

(75) Inventors: Potapov Sergey, Yongin-shi (KR); Ja-Nam Ku, Suwon-shi (KR); Sung-Chul Kim, Seoul (KR); Il-Jong Song, Suwon-shi (KR); Dong-Hoon Chang, Anyang-shi (KR); Seong-Mo Hwang, Suwon-shi (KR); Eung-Yeoul Yoon, Suwon-shi (KR)

(73) Assignee: Samsung Electronics Co., Ltd., (KR)

( * ) Notice: Subject to any disclaimer, the term of this patent is extended or adjusted under 35 U.S.C. 154(b) by 125 days.

(21) Appl. No.: 10/742,960

(22) Filed: Dec. 22, 2003

(65) Prior Publication Data

US 2004/0131311 A1 Jul. 8, 2004

(30) Foreign Application Priority Data

Dec. 31, 2002 (KR) ............... 10-2002-0087991

(51) Int. Cl.
  *G02B 6/32* (2006.01)
(52) U.S. Cl. .................. 385/33; 385/43; 385/50; 385/93
(58) Field of Classification Search ............ 385/33–35, 385/43, 50, 93
See application file for complete search history.

(56) References Cited

U.S. PATENT DOCUMENTS 4,844,580 A * 7/1989 Lynch et al. .............. 385/35
6,037,535 A * 3/2000 Yoshino .................... 136/246
2001/0033712 A1 10/2001 Cox et al.
2005/0089298 A1* 4/2005 Maxwell et al. .......... 385/144

FOREIGN PATENT DOCUMENTS

| CN | 1387626 | 12/2002 |
|---|---|---|
| EP | 0 233 639 | 2/1987 |
| GB | 2 272 306 | 5/1994 |
| JP | 07-077637 | 3/1995 |
| JP | 09-015448 | 1/1997 |
| JP | 2002-187139 | 7/2002 |
| WO | WO 00/46622 | 8/2000 |

* cited by examiner

*Primary Examiner*—Sung Pak
*Assistant Examiner*—Omar Rojas
(74) *Attorney, Agent, or Firm*—Dilworth & Barrese LLP

(57) ABSTRACT

An optical coupling device for coupling light to a core of an optical waveguide device. The optical coupling device is connected to the core of the optical waveguide device at a first end and convex at a second end opposite the first. The optical coupling device includes a waveguide connecting the first and second ends of the optical coupling device, for light transmission, and a cladding surrounding the waveguide.

8 Claims, 17 Drawing Sheets

OPTICAL COUPLING DEVICE, FABRICATING METHOD THEREOF, OPTICAL COUPLING DEVICE ASSEMBLY, AND LENSED FIBER USING THE OPTICAL COUPLING DEVICE

PRIORITY

This application claims priority under 35 U.S.C. § 119 to an application entitled "Optical Coupling Device, Fabricating Method Thereof, Optical Coupling Device Assembly, and Lensed Fiber Using the Optical Coupling Device" filed in the Korean Intellectual Property Office on Dec. 31, 2002 and assigned Ser. No. 2002-87991, the contents of which are incorporated herein by reference.

BACKGROUND OF THE INVENTION

1. Field of the Invention

The present invention relates generally to an optical device, and in particular, to an optical coupling device for coupling light into an optical waveguide device.

2. Description of the Related Art

The recent technological trend is toward fabrication of a low-cost optical module for an optical communication system. Optical coupling is very important to system stability, mass production, and cost reduction. For future-generation optical networks, small, easily aligned optical devices must be developed. One of the current optical devices having the most effective optical coupling characteristics is a lensed fiber.

Effective optical coupling between a laser diode (LD) and an optical fiber is important in an optical communication system. Compared to "butt coupling" or "bulk optics-based coupling", coupling using a lensed fiber offers many benefits. It provides high coupling efficiency, reaching almost 100% in particular cases. Due to the small area of the lensed fiber, it is possible to fabricate a small-size optical module or a coupled LD array. Also, without using an additional device for coupling, thermomechanical stability of lensed fibers is also high.

There are many approaches to fabricating a lensed fiber. An optical fiber having a micro-lens, a polished end, or a laser micro-machined end each exhibit a coupling efficiency nearing 100%. In this optical fiber, light emitted from an LD is coupled directly to a fiber core. Hence, a working distance is very small, merely the diameter of the core. This limitation causes many problems when integrating the lensed fiber into an optical module. The working distance can be increased to about 20 μm using a tapered hemispherical-end fiber. A graded index multimode fiber end can increase the working distance up to 45 μm, though having loss up to a 4 dB. A silica fiber having an aspherical end face can increase the working distance remarkably, up to 153 μm.

In the above cases, axial and lateral misalignment must be relatively small, and the possibility of misalignment has a great impact on mass production and reproducibility of optical modules. While a lensed fiber using an expanded-core fiber and a hemispherically-ended coreless fiber has a long working distance, it suffers a low coupling efficiency of about 4 dB and a small lateral misalignment tolerance of about 1.5 μm. Another coupling device using a pair of graded index-fibers having hemispherical ends has a relatively long working distance of about 50 μm and a great coupling efficiency of 1.5 dB. Yet, its misalignment tolerance is far smaller than that of other lensed fibers and thus only active alignment is allowed. All the above lensed fibers are very complex to fabricate and have low reproducibility.

FIG. 1 illustrates the structure of a conventional lensed fiber and FIGS. 2 to 5 depict the characteristics of the lensed fiber. Referring to FIG. 1, to describe the optical coupling of a conventional lensed fiber 110, an LD 140 is also illustrated. The LD is aligned with the lensed fiber 110 with respect to an optical axis 150. The lensed fiber 110 is divided into a single mode fiber 120 and a hemispherically ended coreless tip 130 connected to the single mode fiber 120. As illustrated in FIGS. 2, 3 and 4, it is impossible for the tip 130 to transfer all incident optical power to the single mode fiber 120 because of severe limitations on incident height h and incident angle Φ, each shown in FIG. 1. The more influential factor is incident height h.

FIG. 2 illustrates incident angle-incident height curves 161, 162 and 163 when a working distance D is 130, 150 and 170 μm, respectively in the case where the end of the tip 130 has a curvature radius R of 75 μm and a length L of 1000 μm.

FIG. 3 illustrates incident angle-incident height curves 171, 172 and 173 when R is 130, 150 and 170 μm, respectively in the case where D=150 μm and L=1000 μm.

FIG. 4 illustrates incident angle-incident height curves 181, 182 and 183 when L is 800, 1000 and 1200 μm, respectively in the case where R=75 μm and D=150 μm.

To enhance coupling capability, the single mode fiber 120 has a thermally expanded core 125 at its end. This kind of single mode fiber 120 is characterized by its normalized frequency being maintained during fabrication. Therefore, the product of a maximum incident height and a maximum incident angle is kept as a constant during thermal expansion of the end of the core 125. Another parameter to consider in the single mode fiber 120, is that as a modal field diameter increases, the diameter of the end of the core 125 increases and a relative refraction index difference decreases.

FIG. 5 illustrates an incident angle-incident height curve 191 of the thermally expanded core 125 and an incident angle-incident height curve 192 of a non-thermally expanded core (not shown). Referring to FIG. 5, a larger amount of optical power can be coupled to the expanded core 125 under the above-described conditions. The end of the thermally expanded core 125 is similar to a tapered optical waveguide in many respects. In one respect, the relative refractive index difference is drastically decreased during thermal expansion. For example, if the diameter of the section of the core end, as taken perpendicularly to a Z axis, increases from 4 to 16.8 μm, the relative refractive index difference falls from 0.356 to 0.02%.

In summary, the conventional lensed fibers offer many benefits including high coupling efficiency, small size, and high stability. However, they have the shortcomings of complex fabrication and low reproducibility. Moreover, they have relatively short working distances and small lateral misalignment tolerances. What is worse, the conventional lensed fibers require precise, expensive tools such as V grooves to achieve high coupling efficiency.

SUMMARY OF THE INVENTION

It is, therefore, an object of the present invention to provide an optical coupling device, a fabricating method thereof, an optical coupling device assembly, and a lensed fiber using the optical coupling device, which are inexpensive and have a long working distance, a high coupling efficiency, and a large lateral misalignment tolerance.

The above object is achieved by an optical coupling device for coupling light to a core of an optical waveguide device, a fabrication method thereof, an optical coupling device assembly, and a lensed fiber using the optical coupling device.

In the optical coupling device assembly, an opened housing has a hole in the bottom, and the optical waveguide device is inserted through the hole. An optical coupling device is fixed to the inner wall of the housing. A first end of the optical coupling device is connected to the core of the optical waveguide device, and a second end thereof is convex. The optical coupling device includes a conicle-shaped waveguide connecting both ends of the optical coupling device, for light transmission, and a cladding surrounding the waveguide.

The lensed fiber has an optical fiber with a core and a cladding surrounding the core, and an optical coupling device. A first end of the optical coupling is connected to the core of the optical fiber and a second end is formed into a convex shape. It includes a conicle-shaped waveguide connecting the first and second ends of the optical coupling device, for light transmission, and a cladding surrounding the waveguide.

In the optical coupling device fabricating method, the optical waveguide device is inserted into a hole formed in the bottom of a housing and a UV-cured mixture is filled in the housing. A conicle-shaped tapering part for converging UV light in the mixture is formed by irradiating UV light onto the surface of the mixture. A connecting part for connecting a narrow end of the tapering part to the core is grown by emitting the UV light through facing ends of the tapering part and the core. Finally, a cladding is formed by irradiating UV light onto the remaining non-cured mixture.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Figure 1:
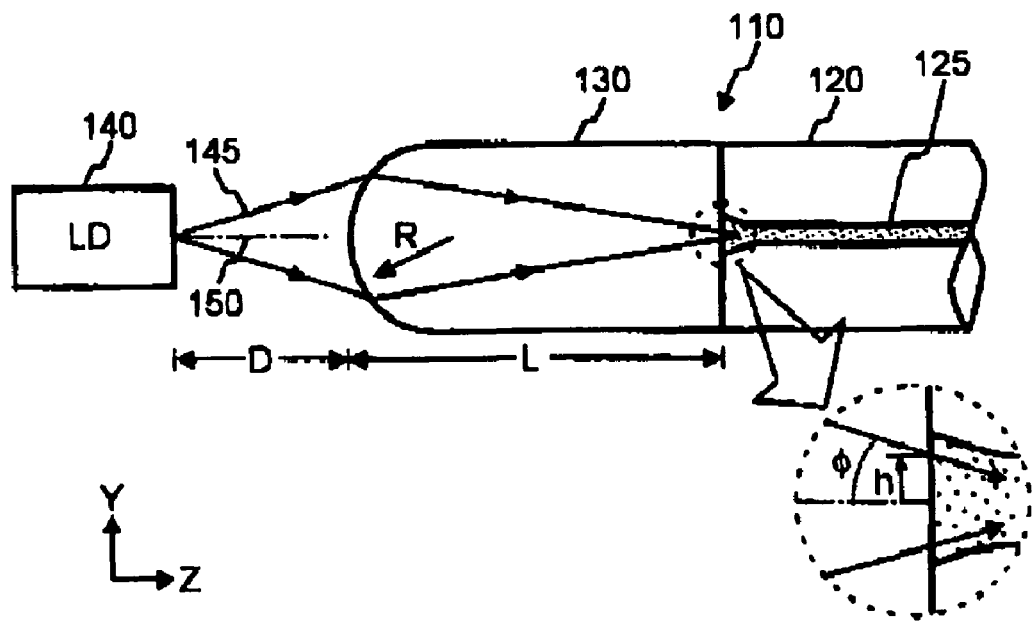
FIG. 1 illustrates the configuration of a conventional lensed fiber.
Figure 2:
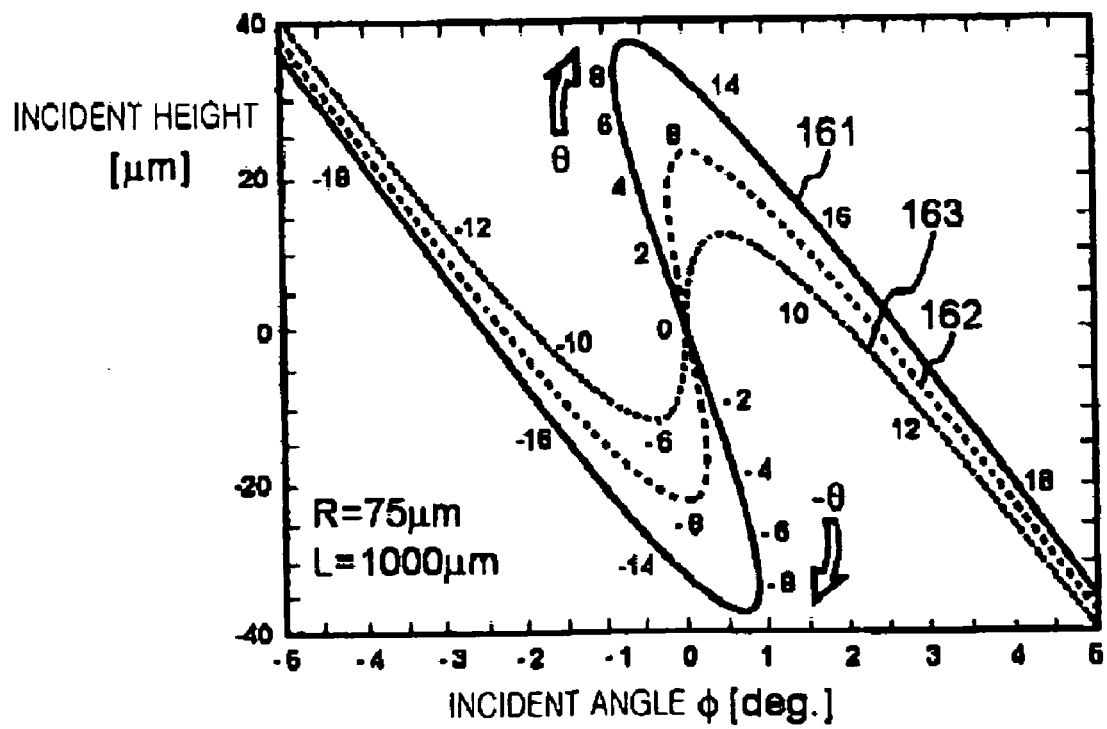
FIGS. 2 to 5 illustrate incident heights versus incident angles for the conventional lensed fiber illustrated in FIG. 1.
Figure 3:
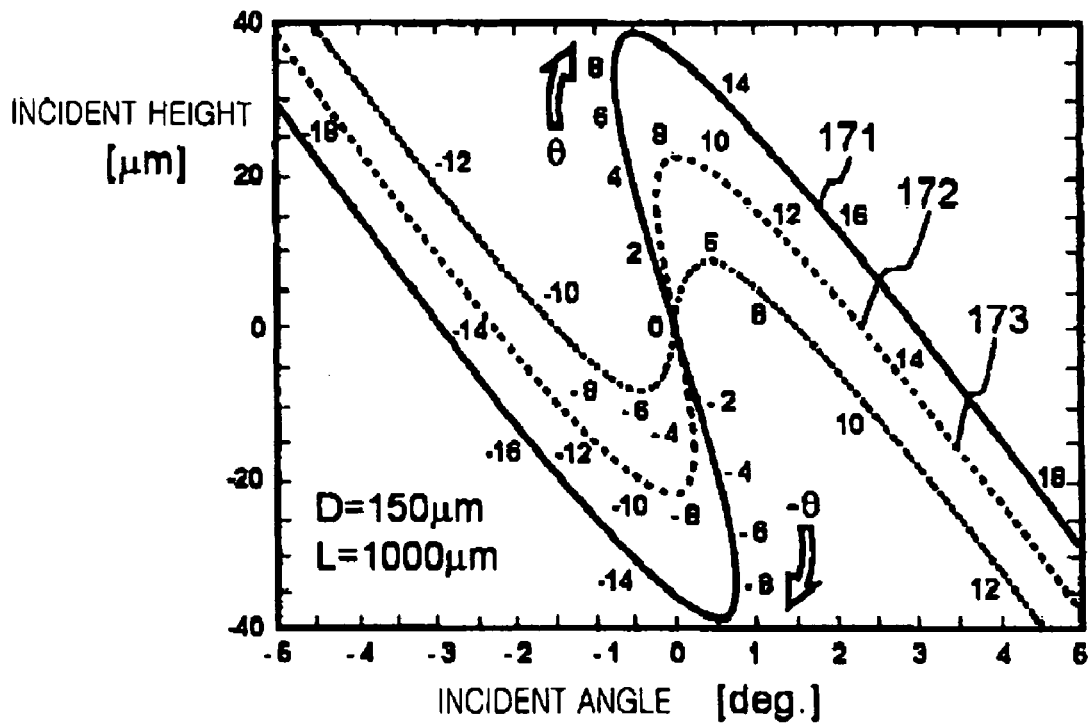
Figure 4:
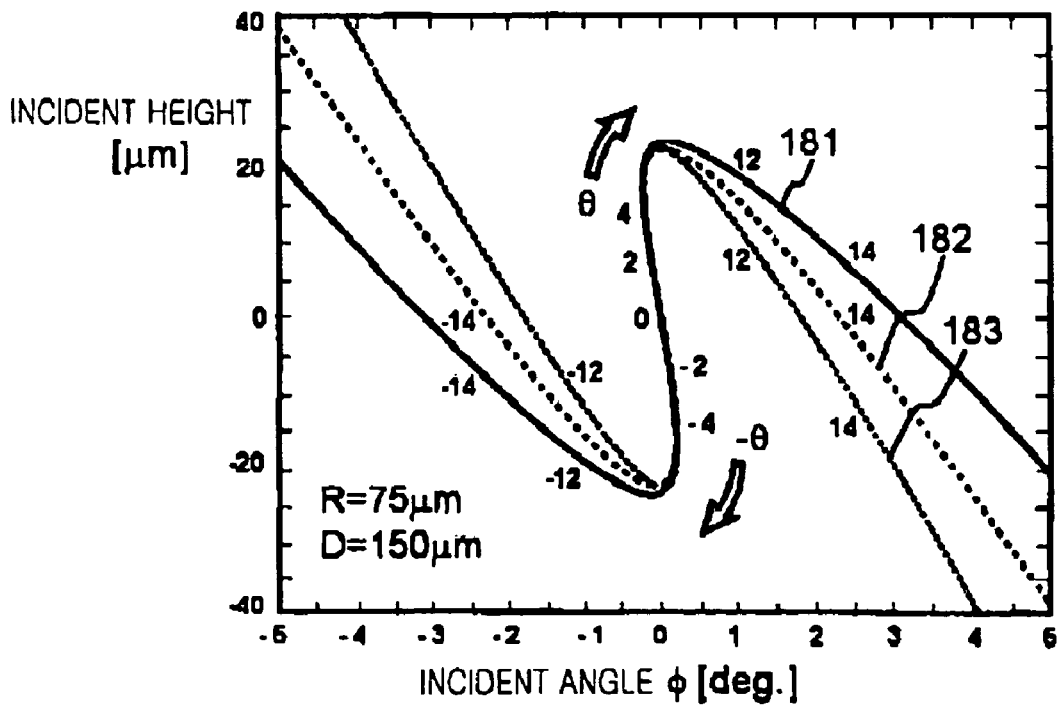
Figure 5:
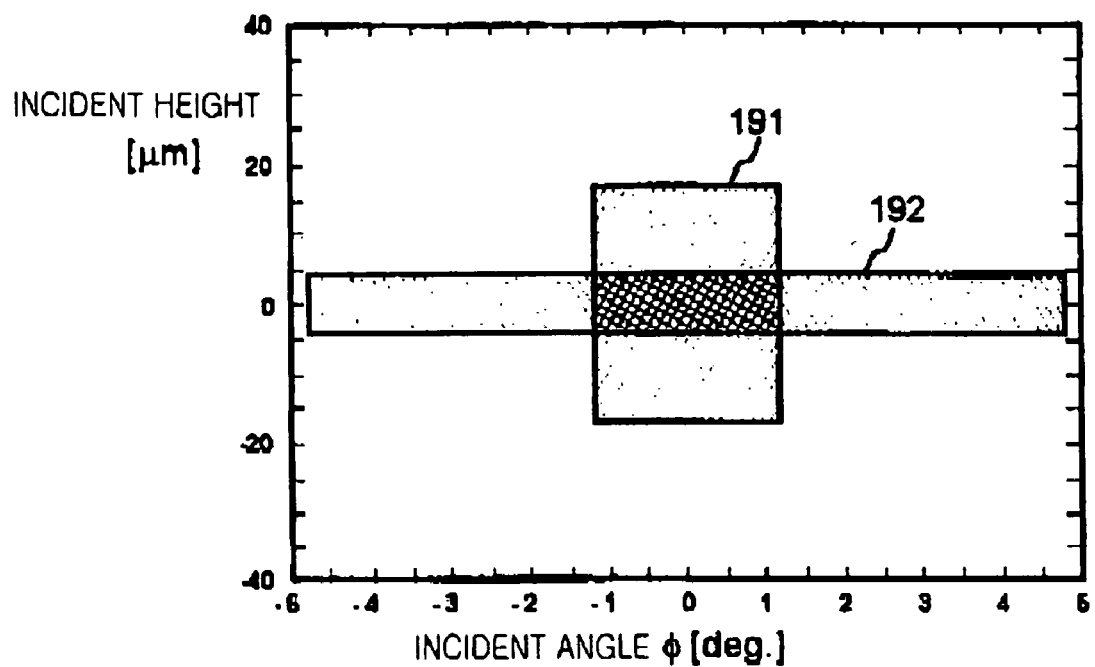
Figure 6:
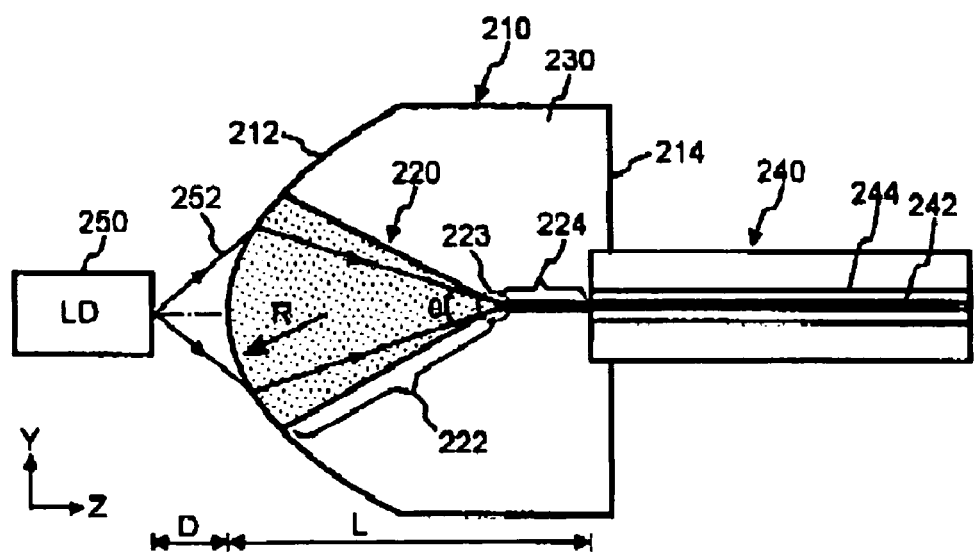
FIG. 6 illustrates the configuration of an optical coupling device according to the present invention.

FIG. 6 is a schematic view illustrating the configuration of an optical coupling device according to the present invention. In addition to the optical coupling device 210, an LD 250 and an optical waveguide device 240 are illustrated to describe the function of the optical coupling device 210.

The LD 250 generates light 252 at a predetermined wavelength and emits the light 252 at a predetermined diffusion angle.

The optical waveguide device 240, spaced from the LD 250 by a predetermined distance D+L, includes a core 242 being a light transmission path and a cladding 244 surrounding the core 242. The optical waveguide device 240 refers to an arbitrary device including a core as a light transmission path. Thus, it can be a single mode fiber drawn from an optical fiber preform, a planar lightwave circuit (PLC) formed by depositing a plurality of layers on a semiconductor substrate, an LD, or a photodiode.

The optical coupling device 210 is spaced from the LD 250 by a predetermined distance D. The optical coupling device 210 has a first end 212 facing the LD 250, convex in a shape and having a predetermined curvature radius R from the center and a second end 214 opposite to the first end 212, the second end 214 being connected to the optical waveguide device 240. The optical coupling device 210 is comprised of a conicle or funnel-shaped waveguide 220 extending between the first and second ends 212 and 214, and a cladding 230 surrounding the waveguide 220. The waveguide 220 has a higher refractive index than the cladding 230. Since the convex first end 212 functions as a lens, light 252 incident on the first end 212 is refracted and converged. The waveguide 220 is divided into an icicle-shaped tapering part 222 with a predetermined interior angle θ and a connecting part 224 connecting the tapering part 222 to the core 242 of the optical waveguide device 240. The section of the tapering part 222 perpendicular to the Z axis becomes smaller from the first end 212 to the second end 214. Even if the focus point of the light incident on the first end 212 is not identical to a preset point (i.e., a convergence point 223 of the tapering part 222), the tapering part 222 serves to converge the light 252 to the convergence point 223 based on reflection of the light 252 at the boundary between the tapering part 222 and the cladding 230. The connecting part 224 couples the converged light 252 to the core 242 of the optical waveguide device 240.

Figure 7:
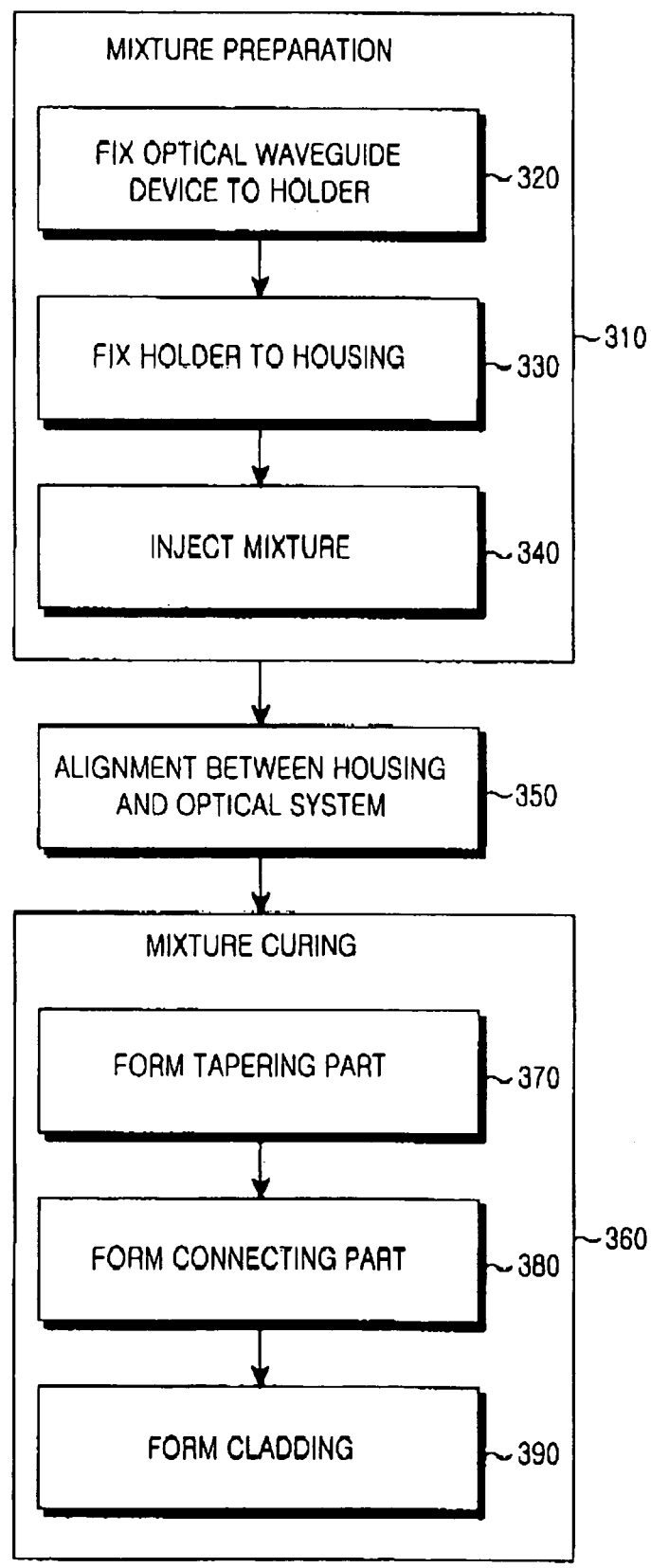
FIG. 7 is a flowchart illustrating a method of fabricating the optical coupling device according to an embodiment of the present invention.

FIG. 7 is a flowchart illustrating a method of fabricating the optical coupling device according to a preferred embodiment of the present invention, and FIGS. 8 to 14 are views sequentially illustrating the fabrication method of FIG. 7. The optical coupling device fabricating method includes preparation (step 310), alignment (step 350), and curing (step 360).

Figure 8:
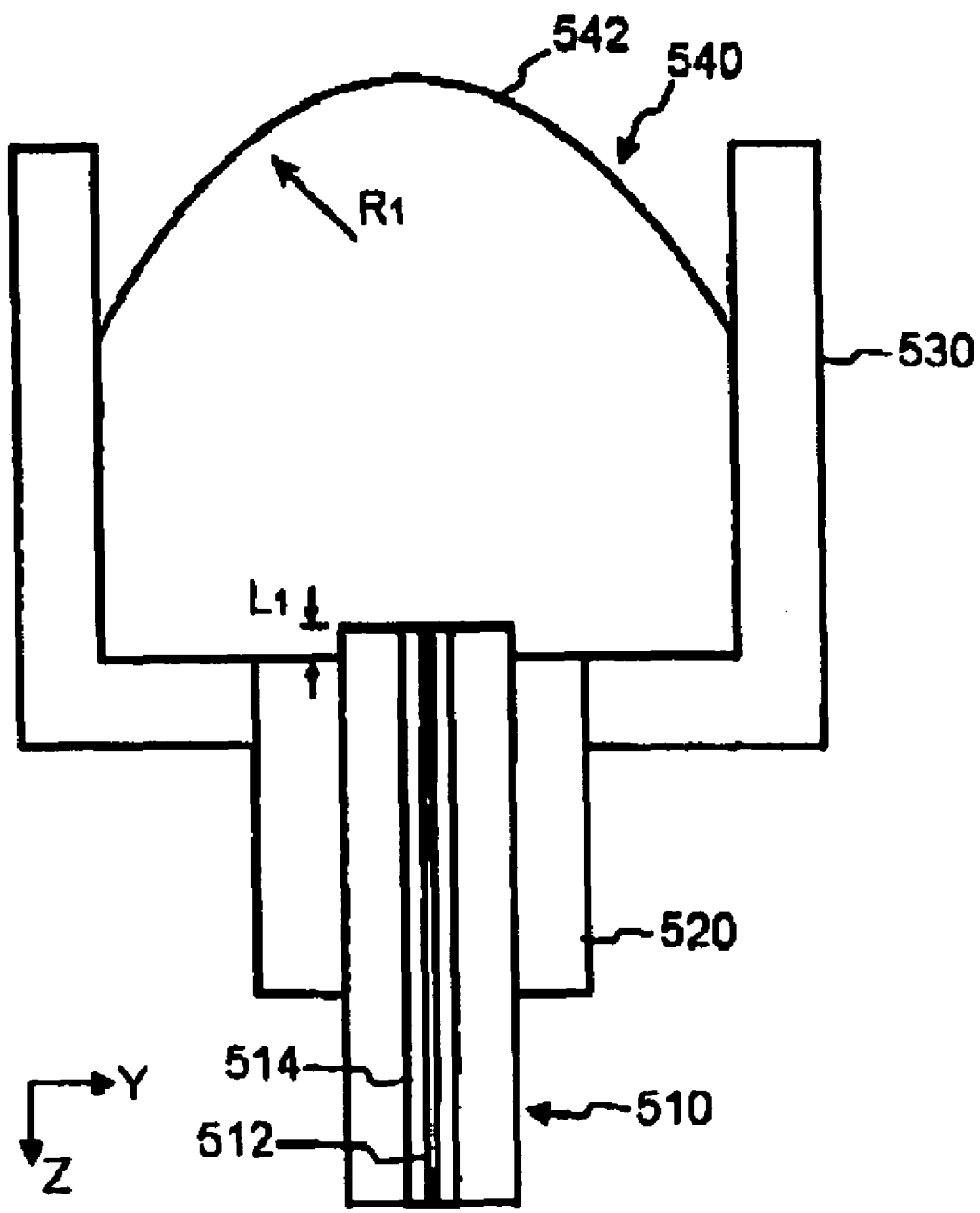
FIGS. 8 to 14 are views sequentially illustrating the fabrication method of FIG. 7.

In step 310, an optical waveguide device is inserted through a hole formed in the bottom of a housing and a mixture is filled in the housing. The resultant is illustrated in FIG. 8. Step 310 is further branched into sub-steps 320, 330 and 340.

In the first sub-step 320, an optical waveguide device 510 having a core 512 and a cladding 514 is fixedly inserted into a hole at the center of a holder 520. Preferably, the optical waveguide device 510 protrudes at least 100 μm (shown as distance $L_1$) from the end of the holder 520. The optical waveguide device 510 can be an optical fiber or PLC, and a ferrule having a circular or square section perpendicular to the Z axis can be used as the holder 520. With the optical waveguide device 510 inserted through the holder 520, an adhesive is introduced into between the inner wall of the holder 520 and the outer circumferential surface of the optical waveguide device 510 and cured, thereby fixing the optical waveguide device 510 to the holder 520. The holder 520 can be, for example, metal or plastic.

In the second sub-step 320, an opened housing 530 having a hole in the bottom is prepared and the holder 520 is inserted into the hole. The housing 530 is formed of a metal or a UV (UltraViolet)-transparent fused silica. The housing 530 and the holder 520 are fixed to each other by laser welding. Alternatively, the housing 530 and the holder 520 can be integrally formed of the same material by, for example, injection molding or casting. The housing 530 preferably has a circular section, optionally a square section, as taken perpendicularly to the Z axis. The hole of the housing 530 is formed into the same shape as the section of the optical waveguide device 510 inserted into the hole.

While the fixed insertion of the optical waveguide device 510 into the holder 520 is followed by the fixed insertion of the holder 520 into the housing 530 in the sub-steps 320 and 330, the order can be reversed. Similarly in the latter case, the optical waveguide device 510 protrudes a predetermined length $L_1$, preferably at least 100 μm from the end of the holder 520.

In the third sub-step 340, a UV-sensitive mixture 540 is filled in the housing 530. The mixture 540 is a solution of different components mixed at a predetermined ratio, at least one of which is UV-sensitive. It is preferable to use a solution of acrylic resin and UV-sensitive epoxy resin at a 50 to 50 ratio as the mixture. The surface 542 of the mixture 540 filled in the housing 530 is convex, almost hemispherical with a predetermined curvature radius $R_1$ from the center. This curvature is due to the surface tension of the mixture 540. $R_1$ can be controlled by adjusting the adhesiveness between the mixture 540 and the inner wall of the housing 530 (i.e., the surface condition of the housing) and the shape and diameter of the Z axis-perpendicular section of the housing 530.

Figure 9A:
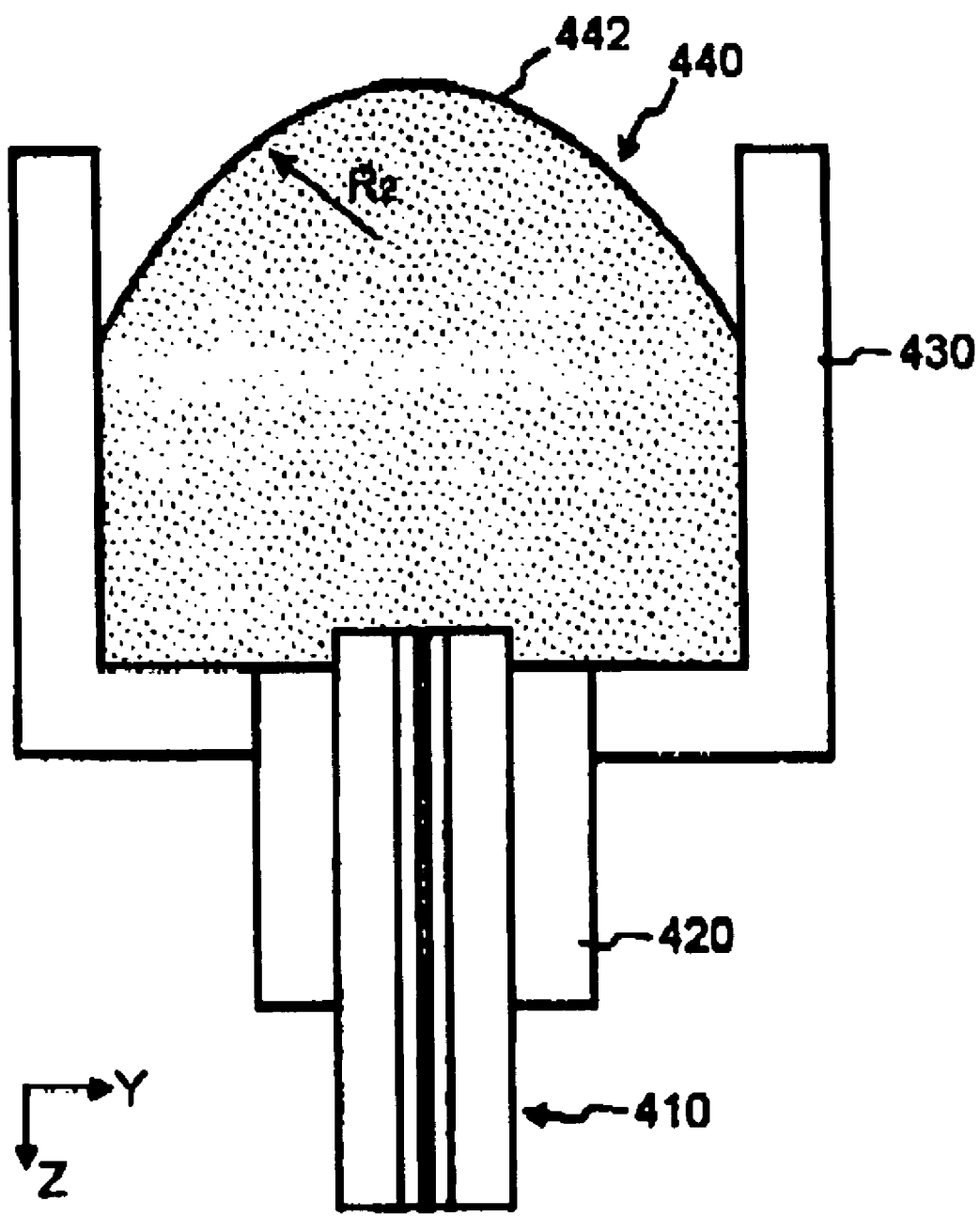
Figure 9B:
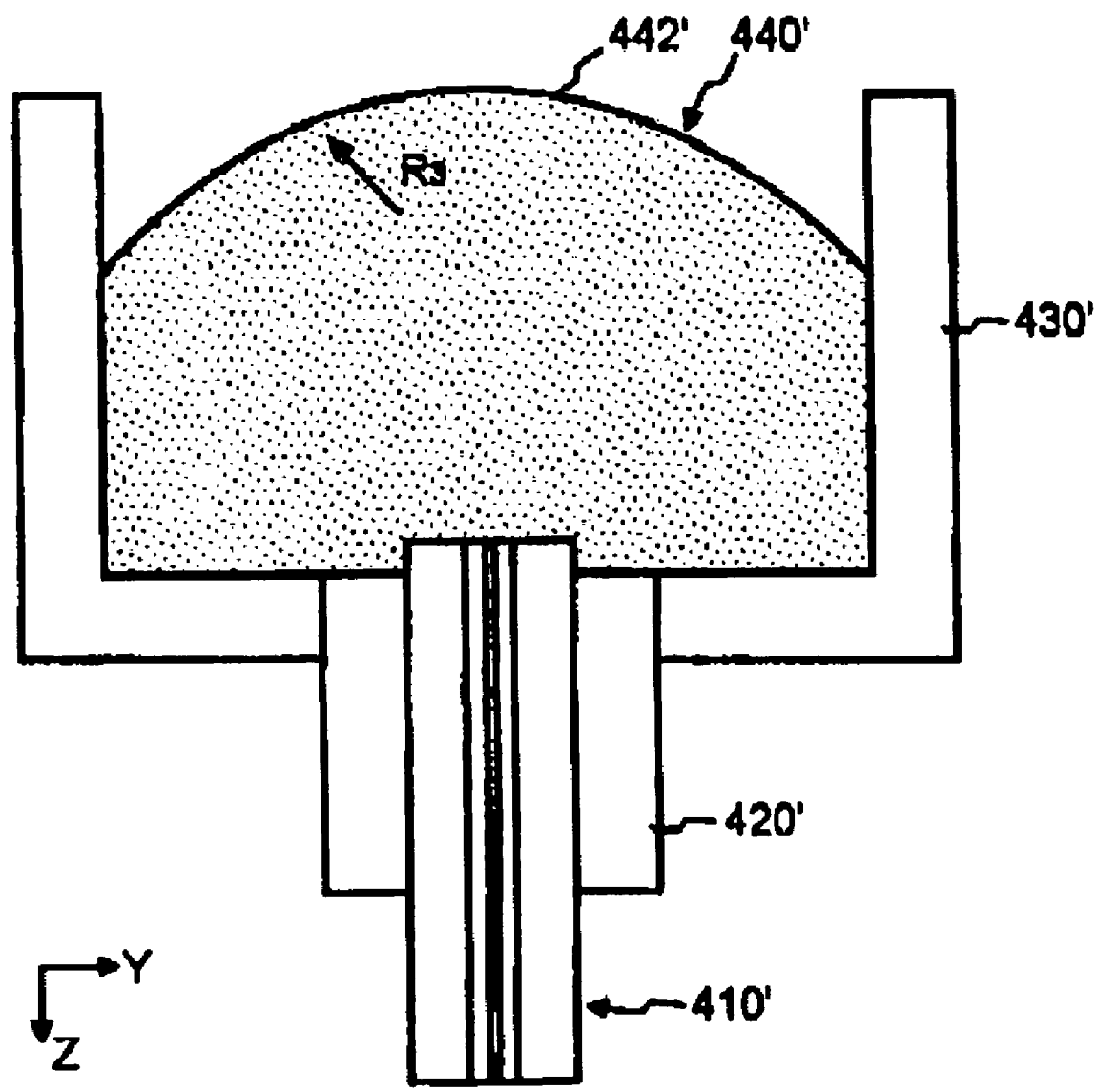

FIGS. 9A and 9B depict the change of the surface curvature of a mixture with respect to the change of the diameter of a cylindrical housing. A first housing 430 having a first diameter (of a Z axis-perpendicular section) and a second housing 430' having a second diameter are illustrated respectively in FIGS. 9A and 9B. The first diameter of housing 430 being less than the second diameter of housing 430'. The curvature radius $R_2$ of the surface 442 of a mixture 440 filled in the first housing 430 is less than curvature radius $R_3$ of the surface 442' of a mixture 440' filled in the second housing 430'. The volumes of the mixtures 440 and 440' influences the distances between their surfaces 442 and 442' and the ends of optical waveguide devices 410 and 410'. Therefore, the volumes of the mixtures 440 and 440' must be controlled precisely with respect to preset geometrical structures of the housings 430 and 430'. The diameters of the housings 430 and 430' influence $R_2$ and $R_3$, and as a result, influence the focus of incident light. Also, $R_2$ and $R_3$ are affected by the interfacial tensions between air and the mixtures 440 and 440', the wetting properties of the housings 430 and 430', the compositions and concentrations of the mixtures 440 and 440', and temperature.

Figure 10:
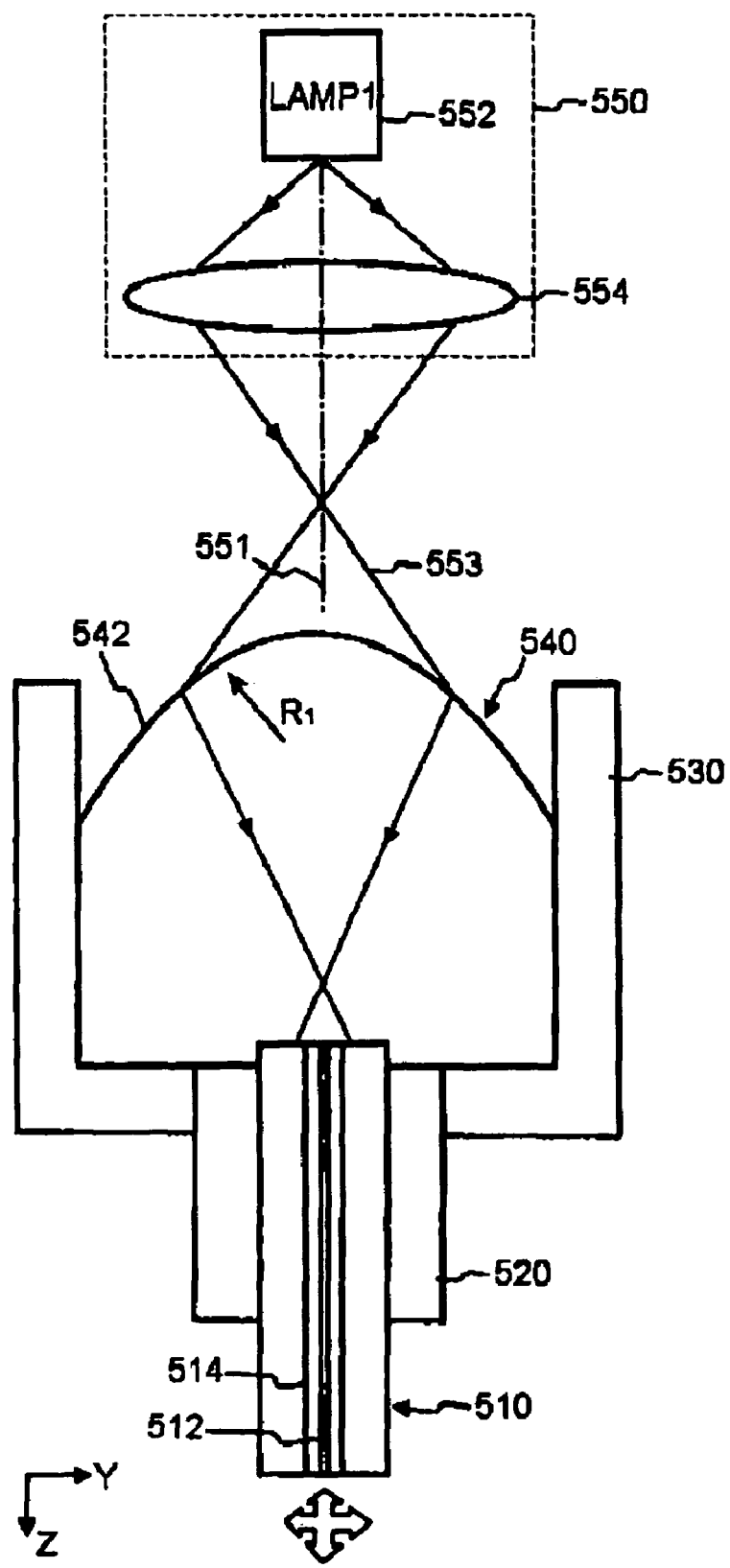

Referring to FIGS. 7 and 10, in the alignment step 350, the housing 530 is centered in preparation for step 360. In step 360, UV light is converged through the surface 542 of the mixture 540 using a first optical system 550. To do so, the housing 530 is aligned with the first optical system 550 with respect to an optical axis 551. This alignment step 350 can be omitted, for example when the overall fabrication process is automated. Otherwise, the alignment step 350 helps precise fabrication.

As illustrated in FIG. 10, the first optical system 550 is comprised of a first convex lens 554 and a first multi-wavelength light source (lamp 1) 552. The first multi-wavelength light source 552 is set to emit non-UV light 553 to prevent the mixture 540 from being cured. Preferably, it emits green light. A mercury lamp can be used as the first multi-wavelength light source 552 and a green filter can further be used to selectively emit green light from the mercury lamp. The light 553 emitted from the first multi-wavelength light source 552 is incident on the first convex lens 554, refracted therefrom, and then converged. The converged light is diffused and reaches the surface of the mixture 540. The convex surface 542 of the mixture 540 converges the incident light 553. Thus, the converged light 553 on the convex surface 542 finds a place where it can be effectively coupled to the optical waveguide device 510, while the housing 530 is moved with the non-UV light irradiated. That is, the light 553 converged by the convex surface 542 is diffused and reaches an end of the optical waveguide device 510, as illustrated in FIG. 10. The power of light emitted from the other end of the optical waveguide device 510 is measured and an optimal position in the housing 530 having a relatively high light power is determined. The optimal position tracing is done first to align the first optical system 550 with the housing 530 with respect to the optical axis 551 and then to decide a UV light focus for the curing step 360 using the first optical system 550. The first optical system 550 can be configured in various ways. It includes largely a lens system and the first multi-wavelength light source 552. As described before, the first multi-wavelength light source 552 can be a mercury lamp or a wavelength tunable laser that outputs visible rays and UV rays. The lens system determines the focus of the light 553 emitted from the first multi-wavelength light source 552 in conjunction with the surface 542 of the mixture 540. While the lens system is shown to have only the first convex lens 554 in FIG. 10, it may have two convex lenses. In this case, a first convex lens collimates the light 553 emitted from the first multi-wavelength light source 552, and a second convex lens collects the collimated light. Also, the light convergence position is altered by moving the second convex lens relative to the first convex lens and thus the focus of the light 553 is controlled by the surface 542 of the mixture 540. The lens system can also be configured using a holographic optical element (HOE) functioning as a lens. While the above alignment is implemented by moving the housing 530, the first optical system 550 can be moved wholly or partially, instead.

Referring to FIG. 7, the mixture 540 is cured in step 360. This curing step 360 is further divided into first, second and third curing sub-steps 370, 380 and 390.

Figure 11:
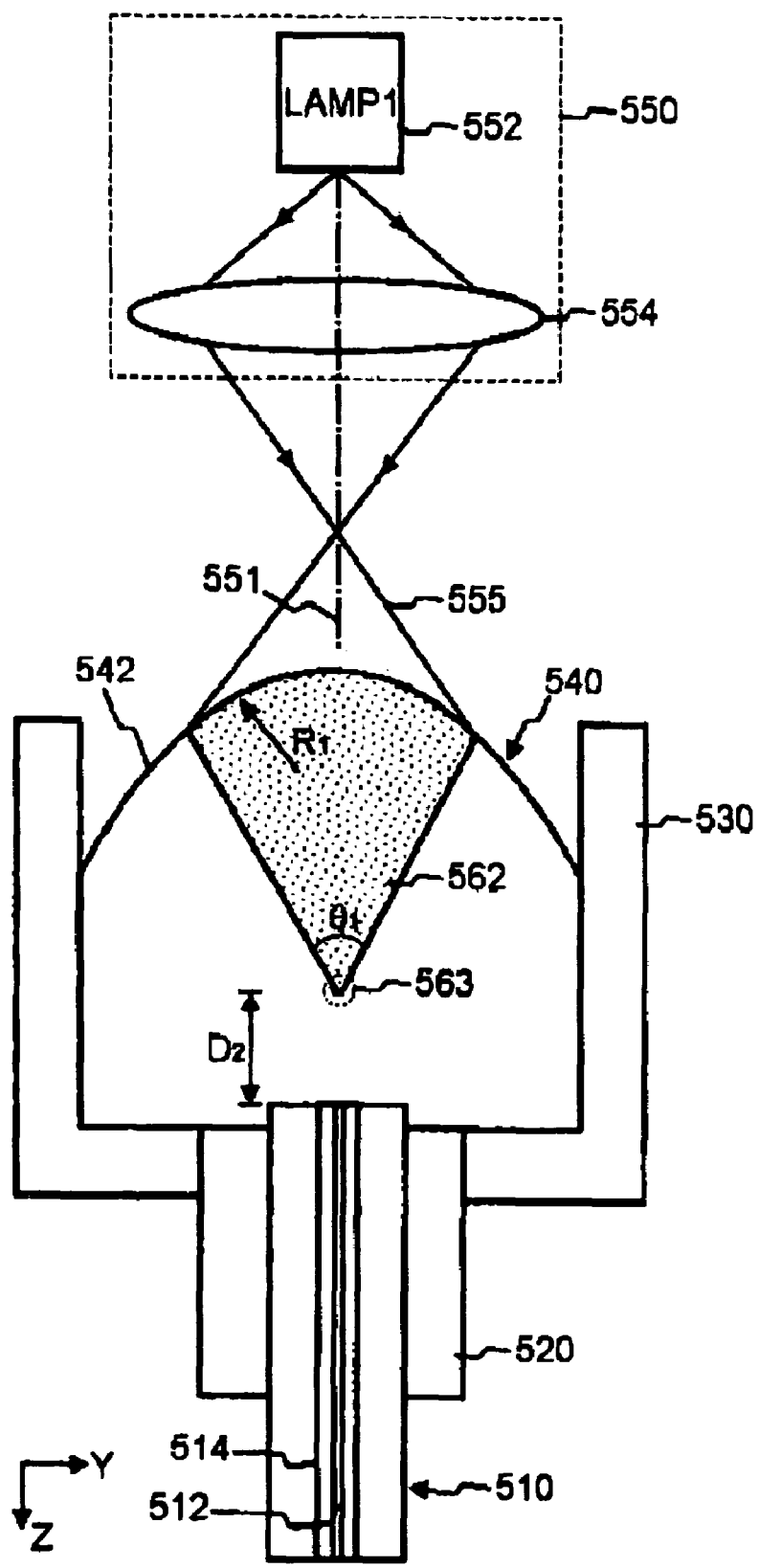

Referring to FIG. 11, a conicle or icicle-shaped tapering part 562 is formed by partially curing the mixture 540 in the first curing sub-step 370. Specifically, dispersed UV light 555 is generated by the aligned first optical system 550 and irradiated onto the surface 542 of the mixture 540. The UV light 555 is refracted on the surface 542 of the mixture 540 and converges therein. Here, the focus of the UV light 555 identical to a convergence point 563 of the tapering part 562 is set to be spaced from the end of the optical waveguide device 510 by, preferably about 100 μm. In other words, to fabricate the funnel-shaped waveguide illustrated in FIG. 6, the focus of the UV light 555 must be spaced from the end of the optical waveguide device 510 by a predetermined distance $D_2$. In the aforementioned aligning step 350, the optimal position of the housing 530 is set in consideration of the focus movement according to the wavelength difference between non-UV light and the UV light 555 in order to satisfy the focusing condition of the UV light 555. Due to the UV-sensitiveness of the mixture 540, the mixture 540 is partially cured by the irradiated UV light 555, thereby forming the icicle-shaped tapering part 562 with a predetermined included angle $\theta_1$. It is observed that about one minute is taken to form the tapering part 562 of length 1000 µm along the optical axis 551. When a solution of acrylic resin and UV-cured epoxy resin mixed at a 50 to 50 ratio is used as the mixture 540, the tapering part 562 grows in the same manner as the acrylic resin does. Therefore, it can be noted that the tapering part 562 is mostly of acrylic resin. This phenomenon occurs in the case where the mixture 540 is a solution of different components mixed at a predetermined ratio and at least one component of the mixture 540 is UV-sensitive. The cause of the phenomenon is identified to be diffusion of the components of the mixture 540. If a single UV-sensitive component is used instead of the mixture 540, the partial curing is possible, but it is not guaranteed that the cured portion differs from its surroundings in refractive index. As a result, optical waveguide functionality is not obtained.

Figure 12:
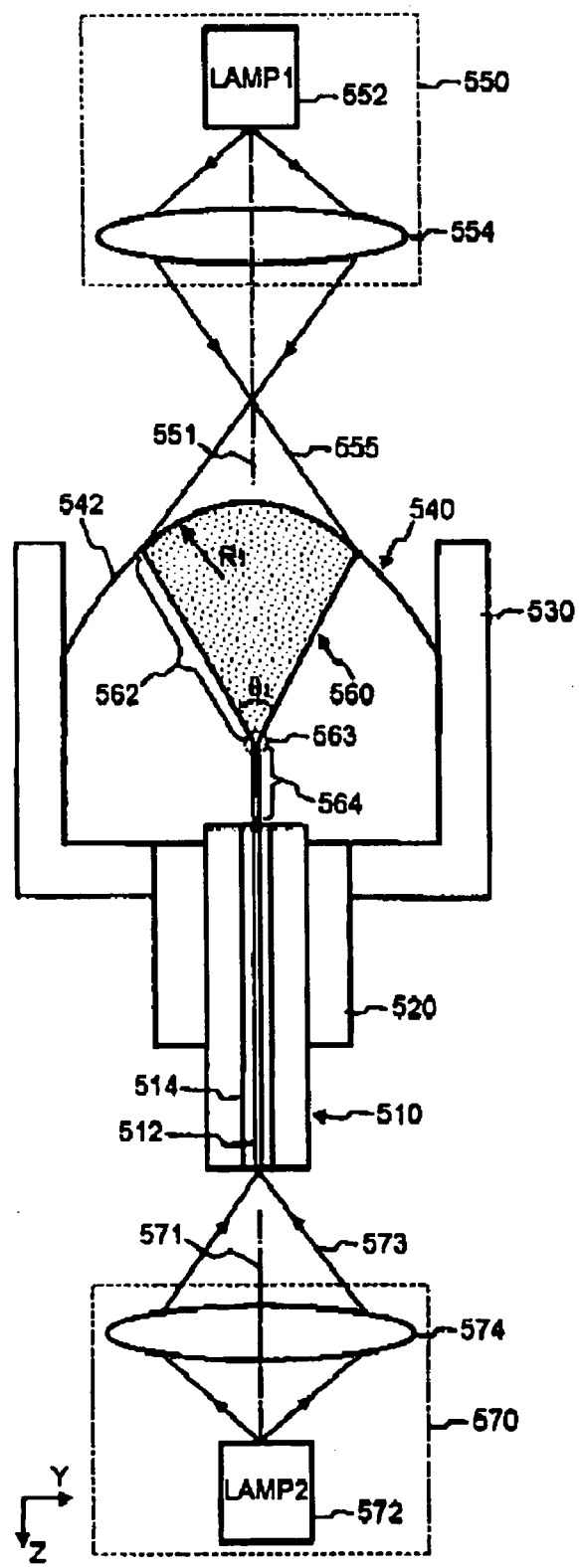

Referring to FIGS. 7 and 12, a connecting part 564 is grown to connect the tapering part 562 to the optical waveguide device 510 by emitting UV light through the facing ends of the tapering part 562 and the optical waveguide device 510 in the second curing sub-step 380. An optical solder effect accounts for this sub-step. The optical solder effect will be described briefly, by way of example. Two facing fiber ends are spaced from each other by a predetermined distance and immersed in a UV-sensitive solution. UV light is then emitted alternately through the fiber ends. As the solution is cured, a waveguide is partially extended from each fiber end. A predetermined time later, the waveguide is completed, connecting the fiber ends. The second curing sub-step 380 forms the connecting part 564 that connects the facing ends of the tapering part 562 and the optical waveguide device 510 according to the optical solder effect. Since the optical solder effect is not very dependent on the alignment between the tapering part 562 with the optical waveguide device 510, there is no need for precisely aligning the tapering part 562 with the optical waveguide device 510 in the previous step. Like the aligning step 350, the second curing sub-step 380 can be omitted in the case where the tapering part 562 can effectively be connected to the core 512 of the optical waveguide device 510, for example, when the overall fabrication process is automated. That is, as an exemplary application of the present invention, it can be contemplated to form an icicle-shaped waveguide extending from the surface 542 of the mixture 540 to the core 512 of the optical waveguide device 510.

Referring to FIG. 12, a second optical system 570 is further used in alignment with the optical waveguide device 510 with respect to an optical axis 571. The second optical system 570 includes a second multi-wavelength light source (Lamp 2) 572 and a second convex lens 574 for coupling UV light 573 emitted from the second multi-wavelength light source 572 into the core 512. In the second curing sub-step 380, the following processes alternate repeatedly until the connecting part 564 is formed.

In the first process, the connecting part 564 is partially extended from the convergence point 563 of the tapering part 562 by means of the first optical system 550. When the UV light 555 is irradiated onto the surface 542 of the mixture 540 by the first optical system, the UV light 555 is converged by the tapering part 562 and proceeds through the convergence point 563. As the mixture 540 is cured by the UV light 555 passed through the convergence point 563, the connecting part 564 is partially grown.

In the second process, the connecting part 564 is partially extended from the core 512 of the optical waveguide device 510 by the second optical system 570. As the UV light 573 is coupled into the core 512 by the second optical system 570, the UV light 573 travels along the core 512 and then passes through the end of the core 512. As the mixture 540 is cured by the UV light 573, the connecting part 564 is partially grown.

Figure 13:
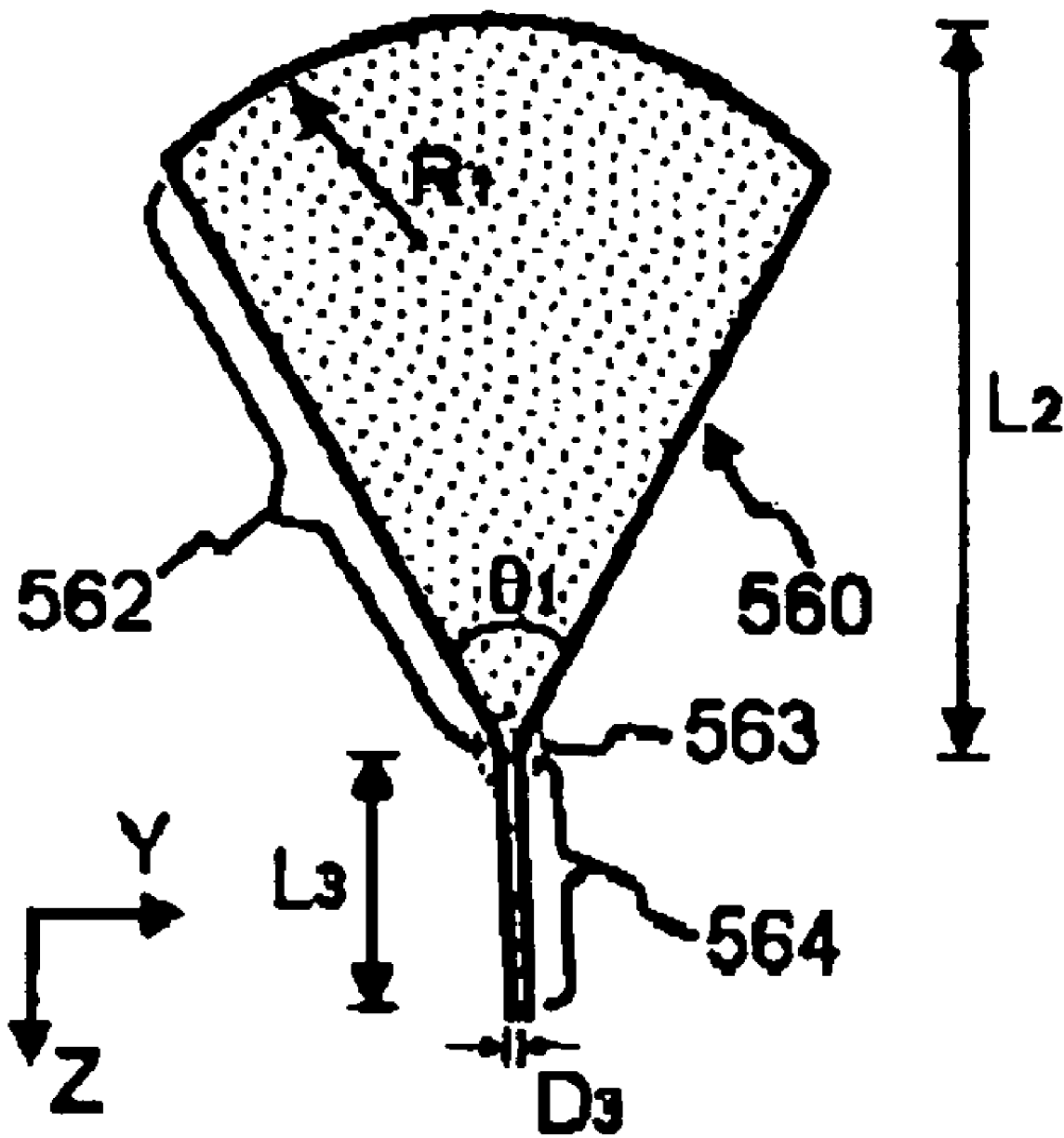

FIG. 13 illustrates only a waveguide 560 produced in the second curing sub-step 380. The optical solder effect-based second curing sub-step 380 does not depend much on the alignment between the tapering part 562 and the optical waveguide device 510. The Z-axis length $L_2$ of the tapering part 562 is 1000 µm and an optical loss in the tapering part 562 is less than 1.5 dB. The Z-axis length $L_3$ (=$D_2$ of FIG. 11) of the connecting part 564 is 150 µm and the misalignment $D_3$ along a Y-axis direction of the connecting part 564 with the core 512 does not exceed 5 µm. The connecting part 564 undergoes an optical loss less than 0.5 dB. The misalignment $D_3$ is dependent on the alignment state of the housing 530 and the growth state of the tapering part 562. By the second curing sub-step 380, the waveguide 560 including the icicle-shaped tapering part 562 and the connecting part 564 is completed.

Figure 14:
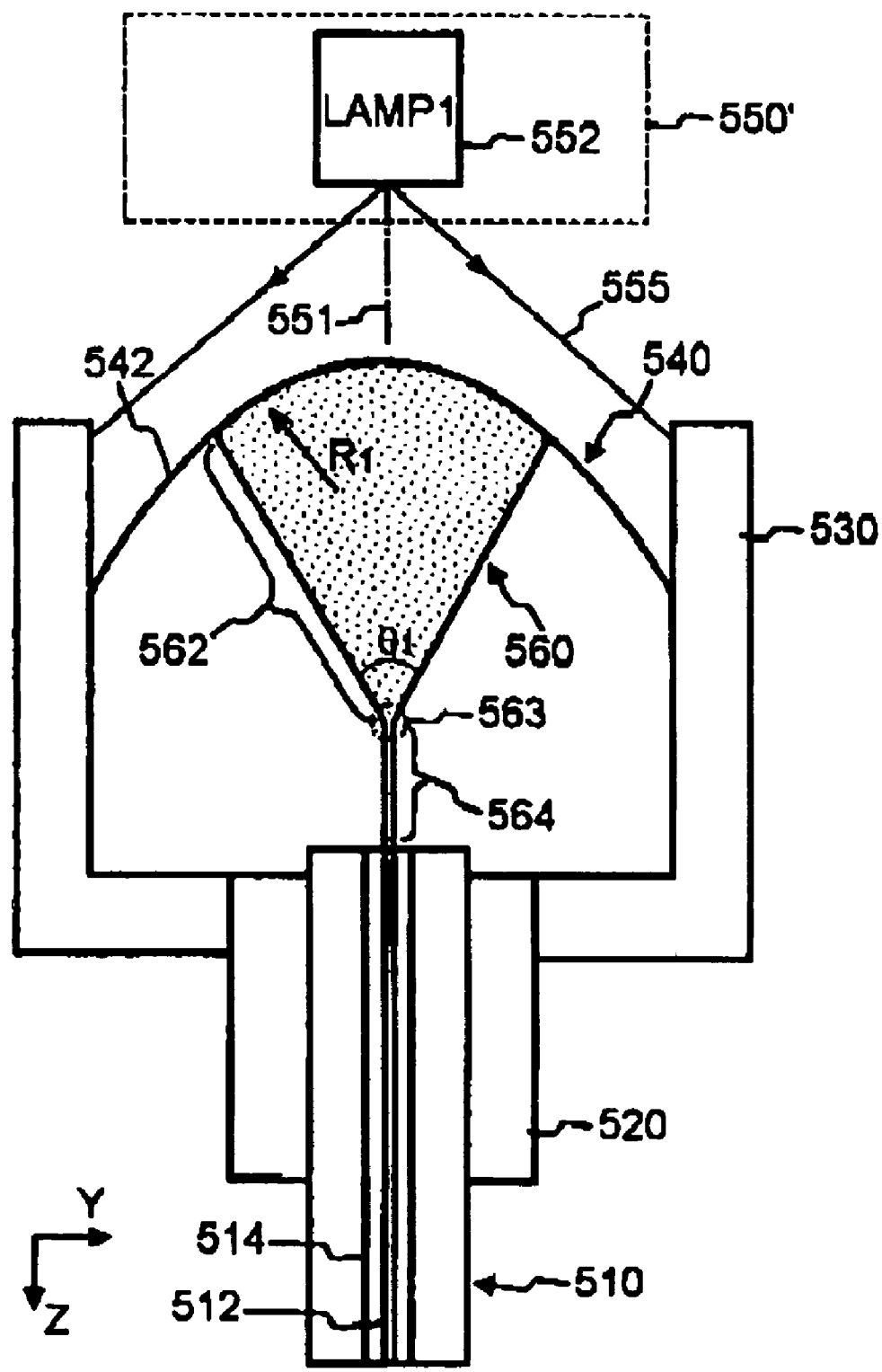

Referring to FIGS. 7 and 14, a cladding is formed by curing the mixture 540 surrounding the waveguide 560 in the third curing sub-step 390. UV light can be irradiated to the mixture 540 in two ways.

One way is to irradiate the UV light 555 onto the surface of the mixture 540. Advantageously, the first optical system 550 can be still used without much displacement. While the UV light is irradiated onto the center of the mixture surface 542 in the first or second curing sub-step 370 or 380, it must be irradiated onto the overall mixture surface 540. Therefore, a first optical system 550' free of the first convex lens is used.

The other way is to irradiate the UV light 555 laterally onto the housing 530. It boasts of relatively uniform and rapid curing of the mixture 540. Notably, the housing 530 must be transparent to UV light, and it can be formed of a fused silica. For example, UV light is irradiated with the first and second multi-wavelength light sources 552 and 572 or two light sources with different wavelengths positioned face to face at both sides of the housing 530.

Referring to FIG. 14, the UV light emitted from the first multi-wavelength light source 552 reaches all over the mixture surface 542. As the mixture 540 is cured by the UV light 555, a cladding having a predetermined refractive index difference from the waveguide 560 is formed.

Figure 15:
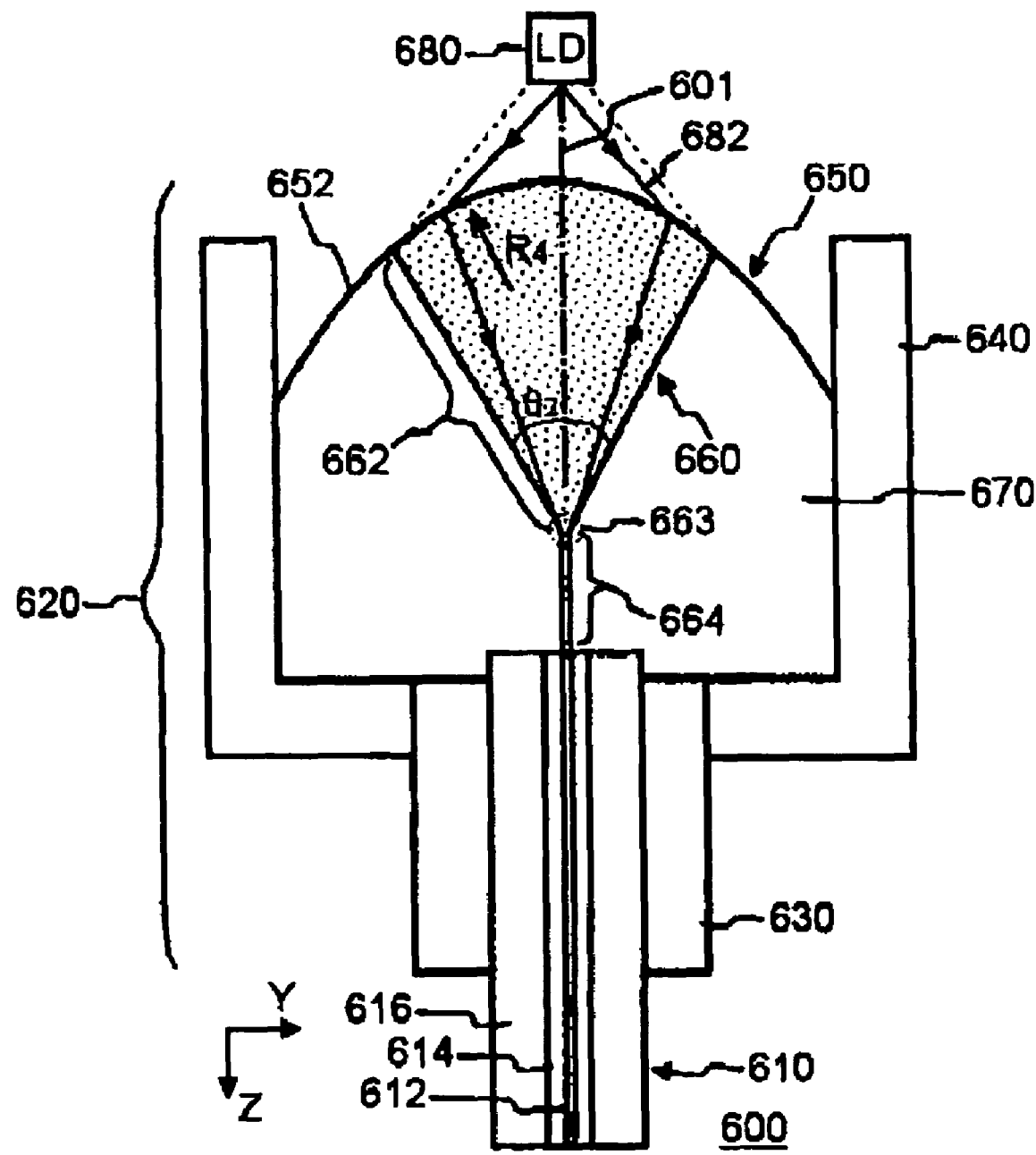
FIG. 15 illustrates the configuration of a lensed fiber according to an embodiment of the present invention.

FIG. 15 illustrates the configuration of a lensed fiber according to an embodiment of the present invention. In addition to a lensed fiber 600, an LD 680 is illustrated to describe the functionality of the lensed fiber 600.

The LD 680 emits light 682 at a predetermined wavelength and the light 682 is diffused at a predetermined angle from the LD 680.

The lensed fiber 600 includes a single mode fiber 610 and an optical coupling device assembly 620. The optical coupling device assembly 620 has a housing 640, a holder 630, and an optical coupling device 650.

The single mode fiber 610 includes a core 612, a cladding 614 surrounding the core 612, and a coating 616 surrounding the cladding 614.

The holder 630 is shaped into a hollow cylinder and the single mode fiber 610 is fixedly inserted into the holder 630, protruding from an end of the holder 630. The single mode fiber 610 can be fixed to the holder 630 in various ways. For example, an adhesive is filled in between the inner wall of the holder 630 and the single mode fiber 610.

The housing 640 is shaped into an opened cylinder having a hole at the center of its bottom. The holder 630 is fixedly inserted into the hole. Both the housing 640 and the holder 630 may be formed of a metal. They can be connected by welding. Alternatively, they can be integrally formed of the same material by injection molding or casting.

The optical coupling device 650 is mounted in the housing 640 and attached to its inner wall. The protruded portion of the single mode fiber 610 is connected to the lower end of the optical coupling device 650. The surface 652 of the optical coupling device 650 is convex. The optical coupling device 650 is divided into a funnel-shaped waveguide 660 extending from the surface 652 to the core 612 of the single mode fiber 610, and a cladding 670 surrounding the waveguide 660. The section of the waveguide 660 becomes smaller as it is farther from the surface 652. The waveguide 660 is divided into a tapering part 662 with a predetermined included angle $\theta_2$, and a connecting part 664 connecting the tapering part 662 to the core 612. At least the center of the surface 652 has a preset curvature radius $R_4$ and a predetermined refractive index difference is set between the waveguide 660 and the cladding 670.

The optimal position of the LD 680 is on an optical axis 601 of the lensed fiber 600 and the focus of the light 682 emitted from the LD 680 coincides with a convergence point 663 of the tapering part 662. At this optimal position, the light 682 reaching the boundary of the tapering part 662 is totally reflected. Thus, reflection-incurred loss is minimized. The connecting part 664 couples the light 682 converged by the tapering part 662 into the core 612.

Figure 16:
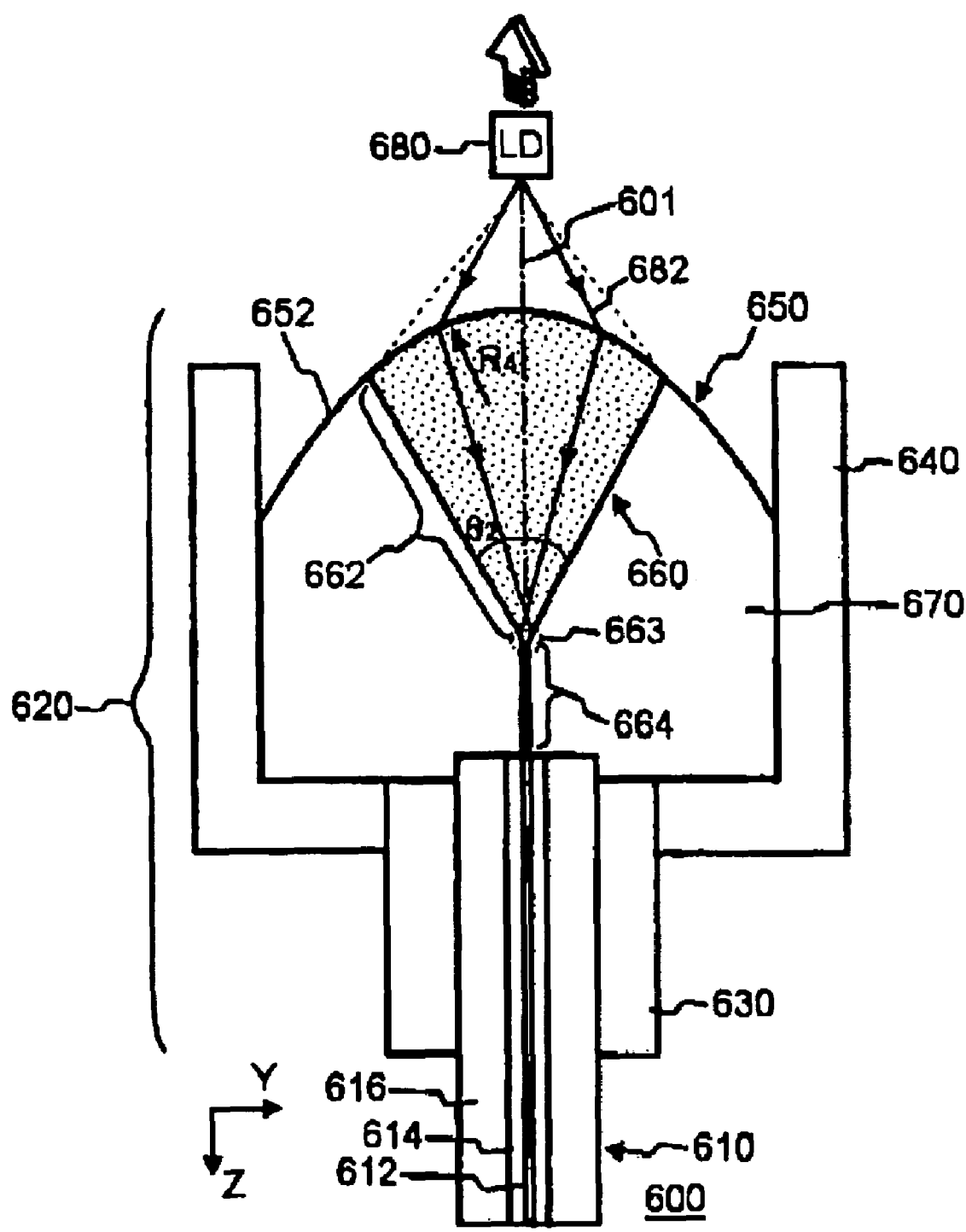
FIGS. 16, 17 and 18 illustrate misalignments of a laser diode (LD) illustrated in FIG. 15.
Figure 17:
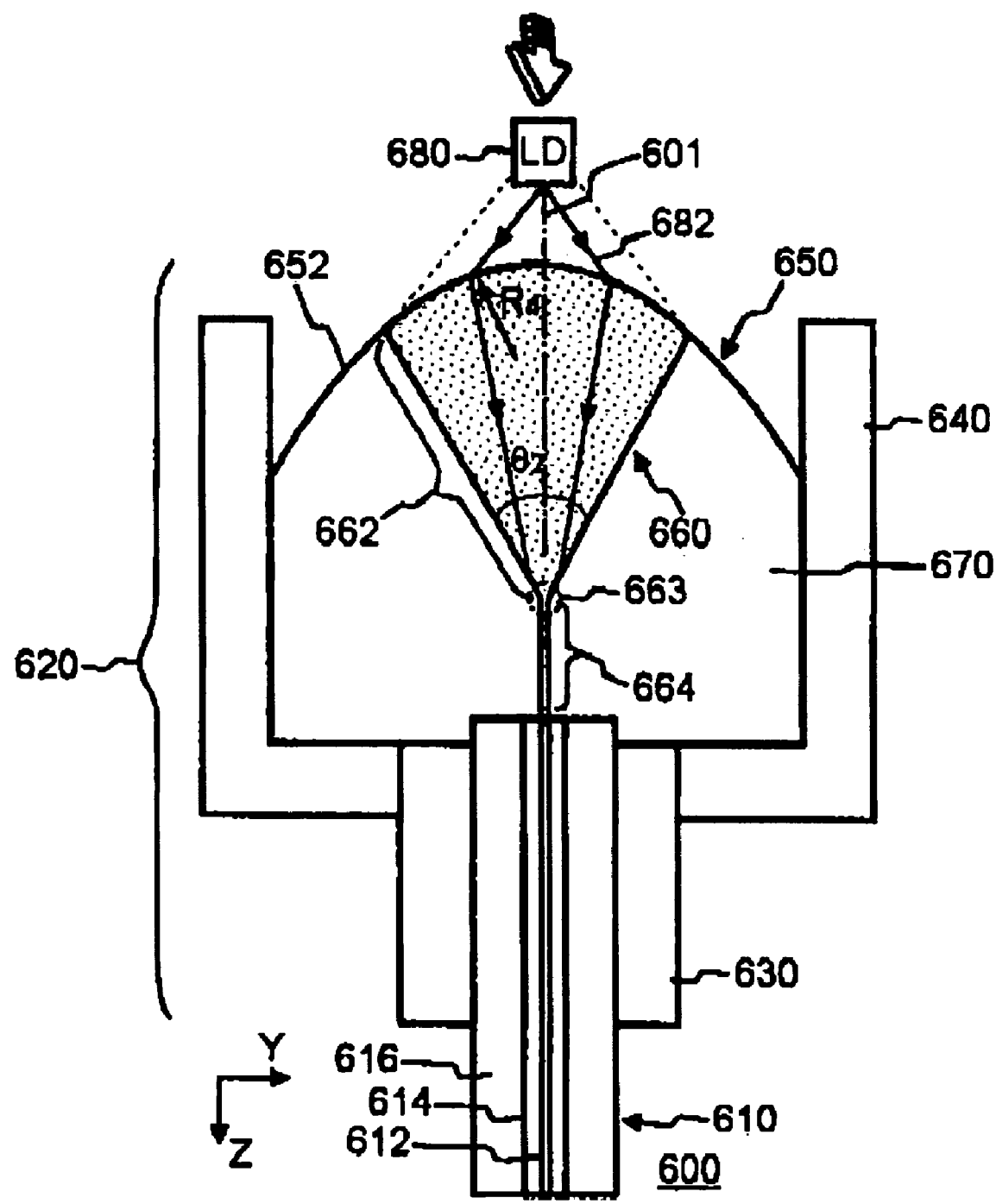
Figure 18:
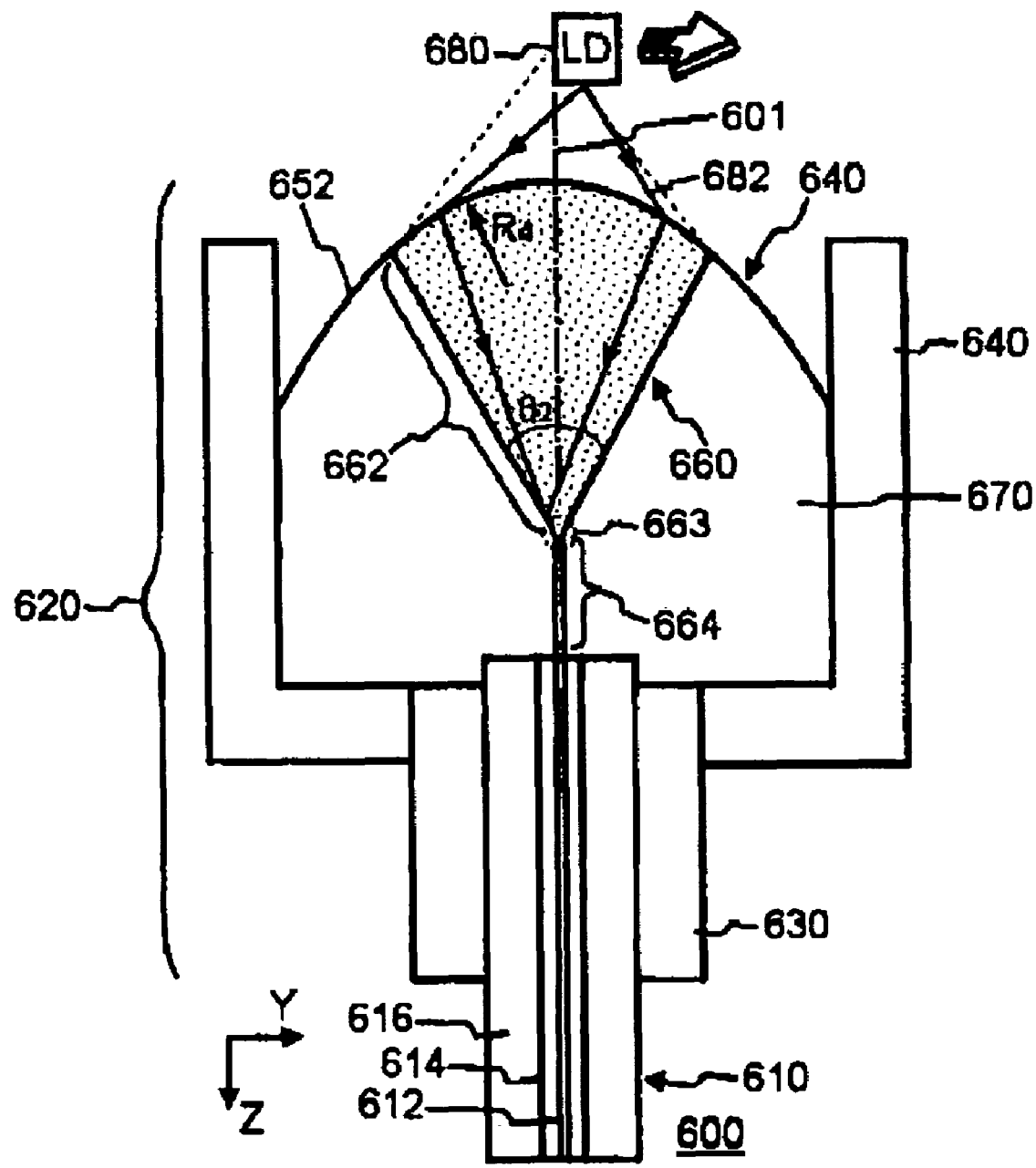

FIGS. 16, 17 and 18 illustrate misalignments of the LD 680 from the optimal position. In FIGS. 16 and 17, the LD 680 is misaligned from the optimal position along the optical axis 601, and in FIG. 18, it is misaligned from the optimal position, in perpendicular direction to the optical axis 601. In the above cases, the convex surface 652 of the optical coupling device 650 functions as a spot size reducer for converging light emitted from the LD 680, and the inclined boundary of the tapering part 662 functions as an angular and position misalignment compensator for compensating the path of light 601 traveling farther from the convergence point 663 of the tapering part 662. The light 682 incident on the tapering part 662 is collected to the convergence point 663 and coupled to the core 612 of the single mode fiber 610, being guided by the connecting part 664.

Figure 19:
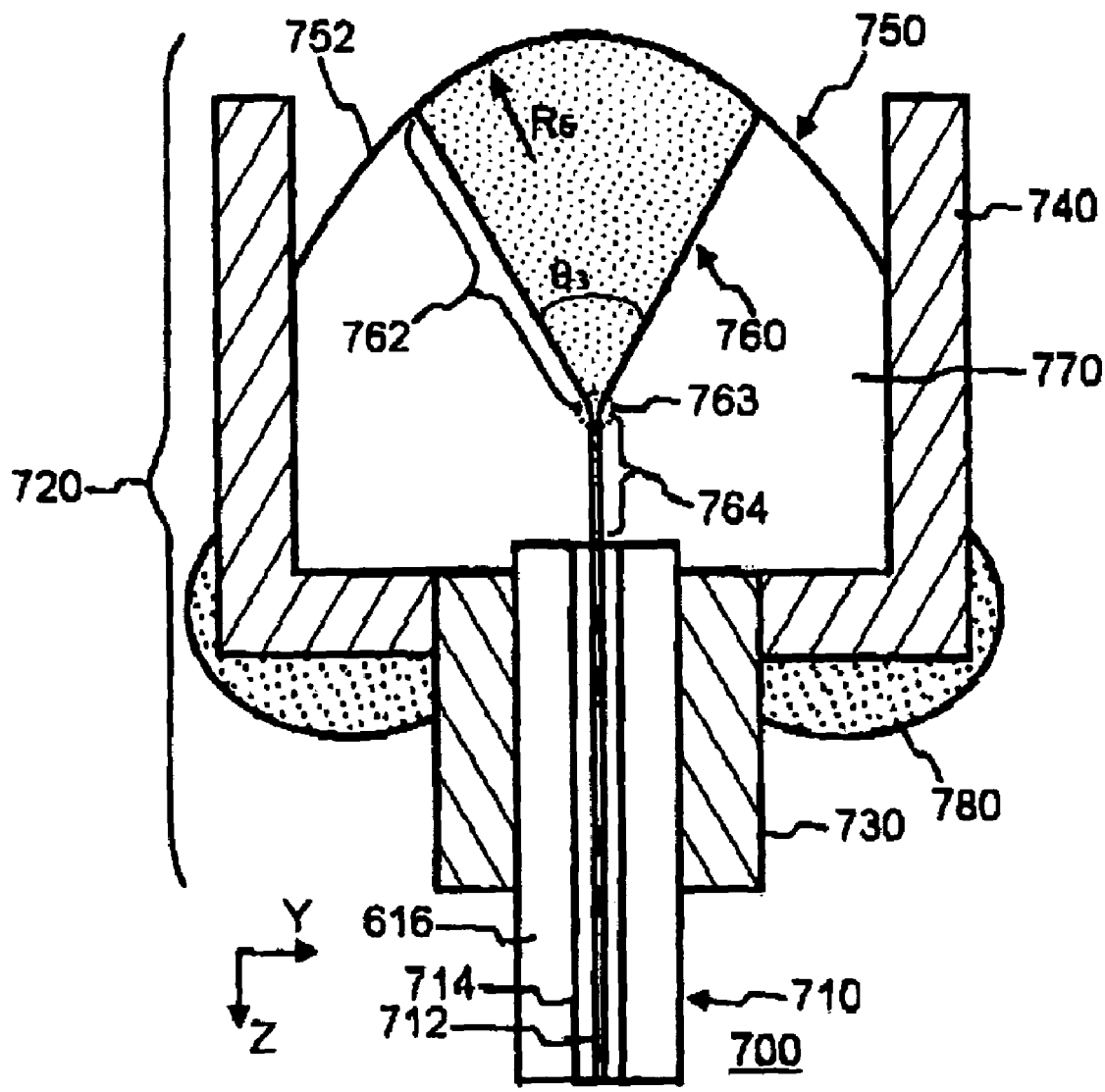
FIG. 19 illustrates the configuration of a lensed fiber according to another embodiment of the present invention.

FIG. 19 illustrates the configuration of a lensed fiber according to another embodiment of the present invention. A lensed fiber 700 is the same in configuration as that illustrated in FIG. 15 except for the material and fixing of a housing 740 and a holder 730. The following description is made mainly of this difference.

The lensed fiber 700 is comprised of a single mode fiber 710 and an optical coupling device assembly 720. The optical coupling device assembly 720 includes a housing 740, a holder 730, and an optical coupling device 750.

The holder 730 is a hollow metal cylinder and the single mode fiber 710 is fixedly inserted into the holder 730, protruding from the end of the holder 730. The single mode fiber 710 can be fixed to the holder 730 in various ways. For example, an adhesive is filled in between the inner wall of the holder 730 and the single mode fiber 710.

The housing 740 is formed of a fused silica. The housing 740 is shaped into an opened cylinder having a hole in its bottom. After the holder 740 is inserted into the hole of the housing 740, epoxy 780 is applied around the hole. As illustrated, the epoxy 780 is applied to the bottom of the housing 740 and part of the sides of the holder 730, thereby tightly fixing the housing 740 and the holder 730.

As described above, the lensed fiber according to the present invention has improved features as compared to the conventional lensed fibers.

(1) A conventional lensed fiber having a thermally expanded-ended core has a reduced relative refractive index difference. On the contrary, the inventive lensed fiber maintains the relative refractive index difference at about 1% by use of a funnel-shaped waveguide formed by UV curing. Thus, a mode field diameter is improved and a larger misalignment tolerance is given for an LD.

(2) The connection of the convex surface of a lens serving as a spot size reducer, an icicle-shaped tapering part serving as a misalignment compensator, and a connecting part for guiding collected light to a single mode fiber improves coupling efficiency and misalignment tolerance significantly. The lensed fiber has a light loss of 2 dB or less and a working distance of about 100 μm. Thus, the lensed fiber facilitates fabrication automation and mass production.

In accordance with the present invention, the optical coupling device, the optical coupling device assembly, and the lensed fiber using the optical coupling device each utilize a funnel-shaped waveguide which is connected to an optical waveguide device and functions as a spot size reducer and a misalignment compensator. Therefore, they offer the benefits of low cost, a long working distance, high coupling efficiency, and a large misalignment tolerance for lateral movement. Furthermore, in the inventive optical coupling device fabricating method, the funnel-shaped waveguide is formed based on the optical solder effect, thereby remarkably increasing a misalignment tolerance.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An optical coupling device for coupling light to a core of an optical waveguide device, comprising:
   a waveguide connecting a first end and a second end opposite the first end of the optical coupling device, for serving as a transmission path of incident light through the optical coupling device, the optical coupling device having the first end connected to the core of the optical waveguide device and the second end convex in shape; and
   a cladding surrounding the waveguide,
   wherein the waveguide and the cladding are formed from a single UV-sensitive mixture, and the waveguide has a higher refractive index than the cladding, by irradiating UV light onto a part of the UV-sensitive mixture at a first stage and irradiating UV light onto a remaining non-cured portion at a second stage.

2. The optical coupling device of claim 1, wherein the waveguide includes:
   a conicle-shaped tapering part for converging the incident light; and
   a connecting part connecting a narrow end of the tapering part to the core, for coupling the converged light to the core.

3. An optical coupling device assembly for coupling light to a core of an optical waveguide device, comprising:

an opened housing having a hole in the bottom, for receiving the optical waveguide device through the hole; and an optical coupling device fixed to the inner wall of the housing, connected to the core of the optical waveguide device at a first end, being convex at a second end opposite the first end, and having a funnel-shaped waveguide connecting the first and second ends of the optical coupling device for light transmission, and a cladding surrounding the waveguide, wherein the waveguide and the cladding are formed from a single UV-sensitive mixture, and the waveguide has a higher refractive index than the cladding, by irradiating UV light onto a part of the UV-sensitive mixture at a first stage and irradiating UV light onto a remaining non-cured portion at a second stage.

4. The optical coupling device assembly of claim 3, wherein the waveguide includes:
a conicle-shaped tapering part for converging incident light; and
a connecting part for coupling light converged by the second end to the core by connecting a narrow end of the tapering part to the core.

5. The optical coupling device assembly of claim 3, further comprising a holder for securing the optical waveguide device into the hole of the housing.

6. A lensed fiber comprising:
an optical fiber having a core and a cladding surrounding the core; and an optical coupling device connected to the core of the optical fiber at a first end, formed into a convex shape at a second end opposite the first end, and having a conicle-shaped waveguide connecting the first and second ends of the optical coupling device, for light transmission, and a cladding surrounding the waveguide, wherein the waveguide and the cladding surrounding the waveguide are formed from a single UV-sensitive mixture, and the waveguide has a higher refractive index than the cladding, by irradiating UV light onto a part of the UV-sensitive mixture at a first stage and irradiating UV light onto a remaining non-cured portion at a second stage.

7. The lensed fiber of claim 6, wherein the waveguide includes:
a conicle-shaped tapering part for converging incident light; and
a connecting part connecting a narrow end of the tapering part to the core, for coupling the converged light to the core.

8. The lensed fiber of claim 6, further comprising:
a holder for securing the optical fiber; and
an opened housing having a hole in the bottom, for receiving the holder through the hole.

* * * * *